United States Patent
Tang

(10) Patent No.: US 9,195,085 B2
(45) Date of Patent: Nov. 24, 2015

(54) BACK PLATE CAPABLE OF RESISTING EXTERNAL FORCES, BACKLIGHT MODULE HAVING THE SAME, AND LIQUID CRYSTAL DISPLAY USING THE SAME

(71) Applicant: SHENZHEN CHINA STAR OPTOELECTRONICS TECHNOLOGY CO., LTD., Shenzhen, Guangdong (CN)

(72) Inventor: Guofu Tang, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 154 days.

(21) Appl. No.: 13/811,196

(22) PCT Filed: Sep. 19, 2012

(86) PCT No.: PCT/CN2012/081569
§ 371 (c)(1),
(2) Date: Jan. 18, 2013

(87) PCT Pub. No.: WO2014/012299
PCT Pub. Date: Jan. 23, 2014

(65) Prior Publication Data
US 2014/0139783 A1    May 22, 2014

(30) Foreign Application Priority Data

Jul. 17, 2012  (CN) .......................... 2012 1 0245770

(51) Int. Cl.
*G02F 1/1335*    (2006.01)
*G02F 1/1333*    (2006.01)

(52) U.S. Cl.
CPC .... *G02F 1/133308* (2013.01); *G02F 1/133602* (2013.01); *G02F 2001/133314* (2013.01)

(58) Field of Classification Search
CPC .............. G02F 2001/133314; G02F 1/133308; G02F 1/133608; G02F 1/133314
USPC .......................................................... 349/58
See application file for complete search history.

(56) References Cited

U.S. PATENT DOCUMENTS

| 2005/0117086 A1* | 6/2005 | Sugahara et al. ............... 349/58 |
| 2007/0126335 A1* | 6/2007 | You et al. ...................... 313/485 |
| 2008/0012498 A1 | 1/2008 | Takata |
| 2008/0170170 A1* | 7/2008 | Jung et al. ........................ 349/58 |
| 2010/0172154 A1* | 7/2010 | Takeuchi et al. .............. 362/613 |
| 2012/0105761 A1* | 5/2012 | Lee et al. ......................... 349/58 |

FOREIGN PATENT DOCUMENTS

| CN | 201145797 Y | 11/2008 |
| CN | 101952643 A | 1/2011 |

(Continued)

*Primary Examiner* — Thanh-Nhan P Nguyen
(74) *Attorney, Agent, or Firm* — Muncy, Geissler, Olds & Lowe, P.C.

(57) ABSTRACT

A back plate includes a first vertical wall, a second vertical wall, and a back plate bottom portion. The first vertical wall is connected with the second vertical wall by a first horizontal wall, and the back plate bottom portion is disposed corresponding to the first horizontal wall, such that the first vertical wall, the second vertical wall, the first horizontal wall, and the back plate bottom portion constitute a square structure. The structure of the back plate not only increase the strength of the back plate but also lower manufacturing cost and weight of the back plate.

10 Claims, 4 Drawing Sheets

(56) References Cited

FOREIGN PATENT DOCUMENTS

| | | |
|---|---|---|
| JP | 2007-207506 A | 8/2007 |
| JP | 2007207506 A | 8/2007 |
| TW | 200719025 A | 5/2007 |
| TW | I300503 B | 1/2008 |

* cited by examiner

BACK PLATE CAPABLE OF RESISTING EXTERNAL FORCES, BACKLIGHT MODULE HAVING THE SAME, AND LIQUID CRYSTAL DISPLAY USING THE SAME

FIELD OF THE INVENTION

The present invention is related to a back plate, a backlight module having the same, and a liquid crystal display using the same, and more particularly, to a back plate which can resist external forces.

BACKGROUND OF THE INVENTION

Generally speaking, the backlight module is classified into a direct type backlight module or an edge-lit type backlight module based on its light source position. The light source of the direct type backlight module is disposed right below the backlight module, and the direct type backlight module is usually applied to large size LCDs. On the other hand, the light source of the edge-lit type backlight module is disposed on the lateral sides of the backlight module, and the edge-lit type backlight module is usually applied to small size LCDs. However, when the size of the panel becomes lager and lager, such as liquid crystal TV display panels, the dimension and weight of the back plate for supporting backlight modules is also become larger. In order to increase the bending strength, the lateral side of the back plate is made into an N shape, or the thickness of the back plate is increased. Therefore, the total weight of the backlight module and the liquid crystal TV is increased.

As shown in FIG. 1, it is a perspective view of a conventional back plate. Please refer to FIG. 2 and FIG. 3 together. FIG. 2 and FIG. 3 are side views of a conventional back plate. A back plate 9 comprises a supporting portion 910 connected with a first vertical wall 920 to form an accommodation space; a horizontal wall 930 connected between the first vertical wall 920 and the second vertical wall 940. The first vertical wall 920, the horizontal wall 930, and the second vertical wall 940 are formed into an N shape.

As shown in FIG. 2, when an external force is applied to the second vertical wall 940, the second vertical wall 940 is bent inward and deformed (the dot line 960 in FIG. 2).

As shown in FIG. 3, when the size of the panel is large, the area of the corresponding back plate 9 has also become large; however, if the bending strength of the supporting portion 910 doesn't increase correspondingly, the supporting portion 910 may be bent inward and deformed (the dot line 950 shown in FIG. 2) once the supporting portion 910 is pressed inward by an external force.

Therefore, it is required to provide a back plate structure, which will not deformed, to which an external force is applied, so as to solve the above mentioned problem.

SUMMARY OF THE INVENTION

One objective of the present invention is to provide a novel backlight module to overcome the deformation problem of the conventional back plate due to external forces.

Another objective of the present invention is to provide a novel backlight module to overcome the deformation problem of the back plate of the conventional backlight module due to external forces. The backlight module provided by the present invention can solve the deformation problem caused by external forces due to large dimensions of the backlight module.

A further objective of the present invention is to provide a novel liquid crystal display (LCD) to overcome the deformation problem of the back plate of the conventional LCD due to external forces. The LCD provided by the present invention can solve the deformation problem caused by external forces due to large dimensions of the LCD, and the deformation problem may lead to damages of internal circuits or components in the LCD.

To achieve above-mentioned objective, the present invention provides a back plate, which comprises a first vertical wall; a second vertical wall, the first vertical wall being connected with the second vertical wall by a first horizontal wall; and a back plate bottom potion, disposed corresponding to the first horizontal wall, such that the first vertical wall, the second vertical wall, the first horizontal wall, and the back plate bottom portion constitute a square structure.

In one embodiment, it further includes: a supporting portion connected with the first vertical wall and located above the back plate bottom portion, and the supporting portion is connected with the back plate bottom portion by a mortise and tenon joint.

In one embodiment, it further including: a supporting portion connected with the first vertical wall and located above the back plate bottom portion, and the supporting portion is connected with the back plate bottom portion by a screw and nut joint.

In one embodiment, the first vertical wall, the back plate bottom portion, a bending portion, the second vertical wall, and the first horizontal wall are made of a same material and integrally formed.

In one embodiment, the back plate bottom portion is connected with the second horizontal wall by a welding means.

To achieve above-mentioned objective, the present invention provides a backlight module, which comprising: a first vertical wall; a second vertical wall, the first vertical wall being connected with the second vertical wall by a first horizontal wall; and a back plate bottom potion, disposed corresponding to the first horizontal wall, such that the first vertical wall and the second vertical wall, the first horizontal wall, and the back plate bottom portion constitute a square structure, and the first vertical wall and the back plate bottom portion form an accommodation space; and a light source, disposed in the accommodation space.

In one embodiment, the light source is disposed above the back plate bottom portion.

In one embodiment, the light source is disposed on the first vertical wall.

To achieve above-mentioned objective, the present invention provides a liquid crystal display, which comprises: a liquid crystal panel; and a backlight module for providing light to the liquid crystal panel. The backlight module comprises a back plate; and a light source, disposed in an accommodation space. The back plate includes a first vertical wall; a second vertical wall, the first vertical wall being connected with the second vertical wall by a first horizontal wall; and a back plate bottom potion, disposed corresponding to the first horizontal wall, such that the first vertical wall and the second vertical wall, the first horizontal wall, and the back plate bottom portion constitute a square structure, and the first vertical wall and the back plate bottom portion form the accommodation space.

From above, the effects of the back plate, the backlight module, and the liquid crystal display of the present invention lie in that: by using a square structure constituted by a first vertical wall, a second vertical wall, a first horizontal wall and a back plate bottom portion (or a second horizontal wall), the strength of the back plate can be increased to resist external forces, and reduce manufacturing cost and weight.

The details of one or more embodiments are set forth in the accompanying drawings and the description below. Other features will be apparent from the description and drawings, and from the claims.

DETAILED DESCRIPTION OF THE INVENTION

Hereinafter, preferred embodiments of the present invention will be described in detail with reference to the accompanying drawings.

Figure 1:
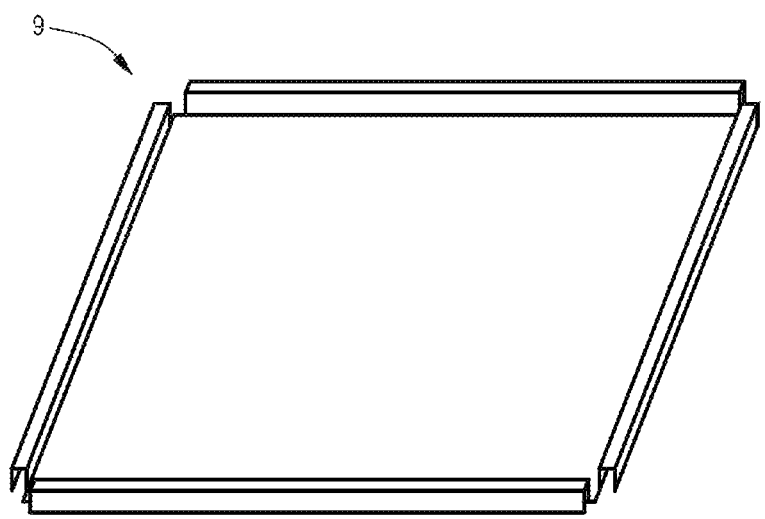
FIG. 1 is a perspective view of a conventional back plate.
Figure 2:
FIG. 2 is a side view of the conventional back plate.
Figure 3:
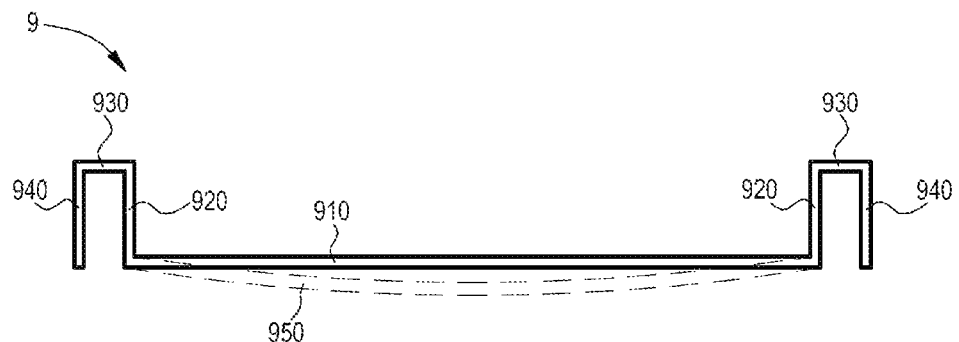
FIG. 3 is a side view of the conventional back plate.
Figure 4:
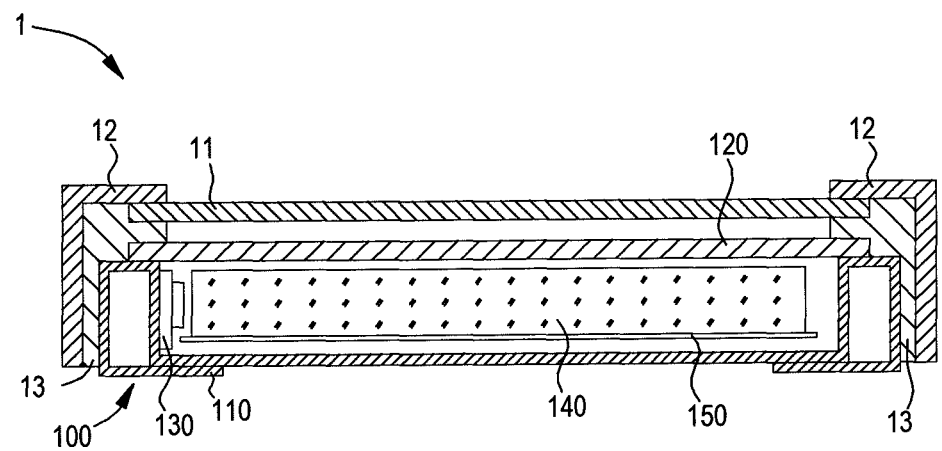
FIG. 4 is a cross-section view of an edge-lit type liquid crystal display according to one embodiment of the present invention.

FIG. 4 is a cross-section view of an edge-lit type liquid crystal display according to one embodiment of the present invention. The liquid crystal display 1 comprises: a liquid crystal panel 11, a front frame 12, a middle frame 13, and a backlight module 100.

The middle frame 13 is disposed on the inner side of the front frame 12, and a supporting portion is extending from the inner side of the middle frame 13. The backlight module 100 is disposed between the front frame 12 and the supporting portion. In addition, the liquid crystal panel 11 is fixed by inserting between the front frame 12 and the supporting portion. The backlight module 100 is disposed on the inner side of the middle frame 13 and under the supporting portion.

The backlight module 100 comprises a back plate 110, an optical sheet 120, a light source 130, a reflective sheet 150, and a light guide plate 140.

The optical sheet 120 is disposed between the supporting portion of the middle frame 12 and the back plate 110, and the optical sheet 120 is composed of a diffusion sheet, a prism sheet, and a brightness enhancement film. In addition, the light guide plate 140 is disposed between the optical sheet 120 and the back plate 110, and the light source 130 is disposed on the first vertical wall of the back plate 110.

Figure 5:
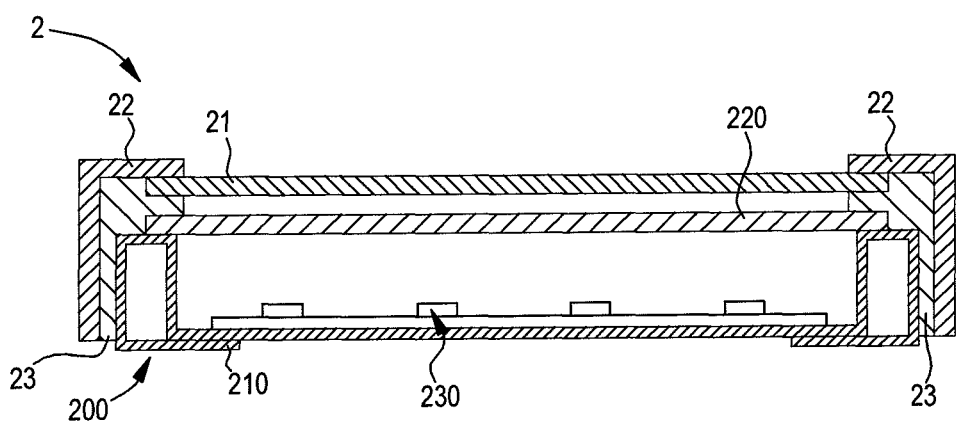
FIG. 5 is a cross-section view of a direct-type liquid crystal display according to one embodiment of the present invention.

FIG. 5 is a cross-section view of a direct-type liquid crystal display according to one embodiment of the present invention. The liquid crystal display 2 comprises a liquid crystal panel 21, a middle frame 23, and a backlight module 200.

The middle frame 23 is disposed on the inner side of the front frame 22, and a supporting portion is extending from the inner side of the middle frame 23. The liquid crystal panel 21 is disposed between the front frame 22 and the supporting portion. In addition, the liquid crystal panel 21 is fixed by inserting between the front frame 22 and the supporting portion. The backlight module 200 is disposed on the inner side of the middle frame 23 and under the supporting portion.

The backlight module 200 comprises a back plate 210, an optical sheet 220, and a light source 230.

The optical sheet 220 is disposed between the supporting portion of the middle frame 23 and the back plate 210. The light source 230 is disposed above the bottom portion of the back plate 210.

Figure 6:
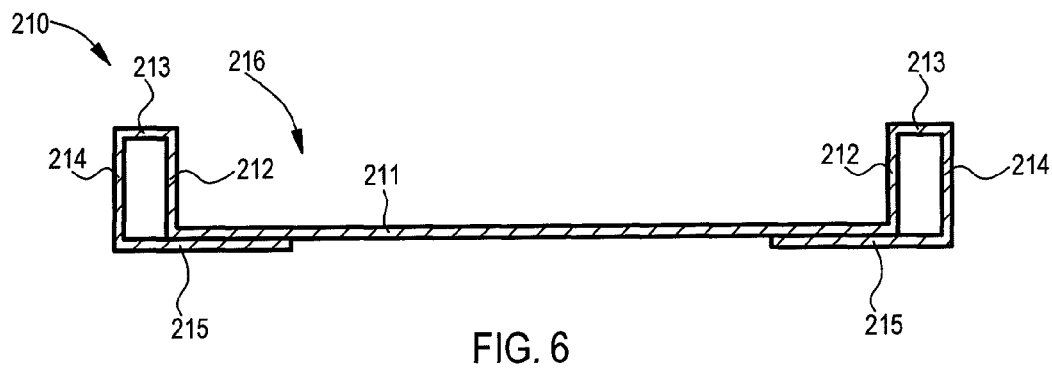
FIG. 6 is a side view of a back plate according to a first embodiment of the present invention.

FIG. 6 is a side view of a back plate according to a first embodiment of the present invention, which is used for the edge-lit type liquid crystal display and the direct type liquid crystal display. The back plate 210 comprises a first vertical wall 212, a supporting portion 211, a back plate bottom portion 215, a second vertical wall 214, and a first horizontal wall 213.

The back plate 210 is constituted by connecting the supporting portion 211 with the first vertical wall 212 to form an accommodation space 216 for disposing light sources; the back plate bottom portion 215 is disposed corresponding to the first horizontal wall 213 and attached to the supporting portion 211; the first vertical wall 212 is connected with the second vertical wall 214 by a first horizontal wall 213. The first vertical wall 212, the second vertical wall 214, the first horizontal wall 213 and the back plate bottom portion 215 constitute a square structure. In the first embodiment of the present invention, the first vertical wall 212, the supporting portion 211, the back plate bottom portion 215, the second vertical wall 214 and the first horizontal wall 213 can use the same material to be integrally formed by a stamping process so as to form the back plate 210.

Figure 7:
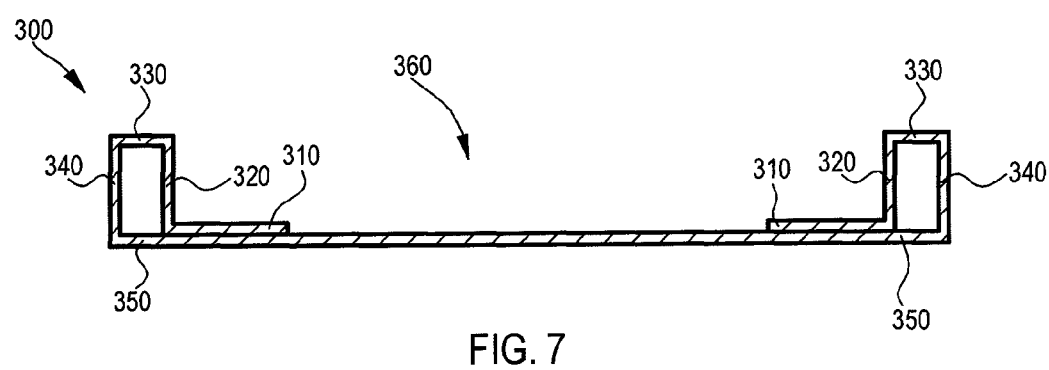
FIG. 7 is a side view of a back plate according to a second embodiment of the present invention.

FIG. 7 is a side view of a back plate according to a second embodiment of the present invention, which is used for the edge-lit type liquid crystal display and the direct type liquid crystal display.

The back plate 300 is constituted by connecting a bending part 310 with a first vertical wall 320; a back plate bottom portion 350 is disposed corresponding to the first horizontal wall 320 and attached to the bending part 310 such that the first horizontal wall 320 and the back plate bottom portion 350 form an accommodation space 360; a second vertical wall 340 is connected with the back plate bottom portion 350, and is disposed corresponding to the first vertical wall 320; the first vertical wall 320 is connected with the second vertical wall 340 by a first horizontal wall 330. The first vertical wall 320, the second vertical wall 340, the first horizontal wall 330 and the back plate bottom portion 350 constitute a square structure. In the second embodiment of the present invention, the first vertical wall 320, the bending part 310, the back plate bottom portion 350, the second vertical wall 340 and the first horizontal wall 340 can use the same material to be integrally formed by a stamping process so as to form the back plate 300.

Figure 8:
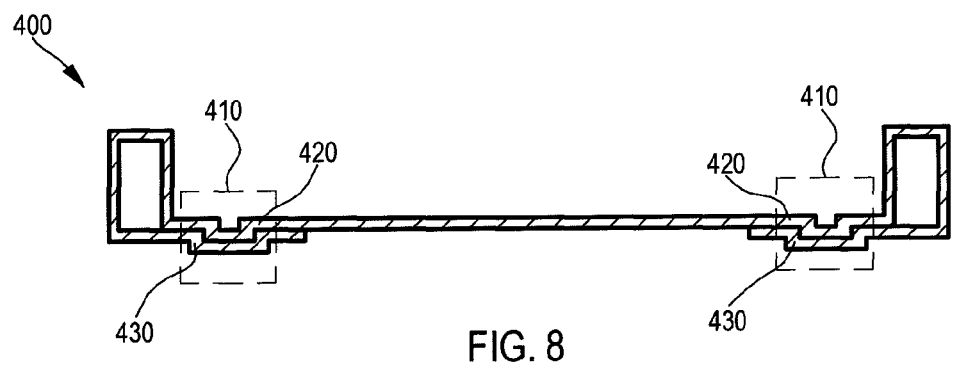
FIG. 8 is a side view of a back plate according to a third embodiment of the present invention.

FIG. 8 is a side view of a back plate according to a third embodiment of the present invention, which is used for the edge-lit type liquid crystal display and the direct type liquid crystal display.

The back plate 400 of the third embodiment is identical to the back plate of the first embodiment. However, it further includes a mortise and tenon joint 410, such that the supporting portion 420 is connected with the back plate bottom portion 430.

Figure 9:
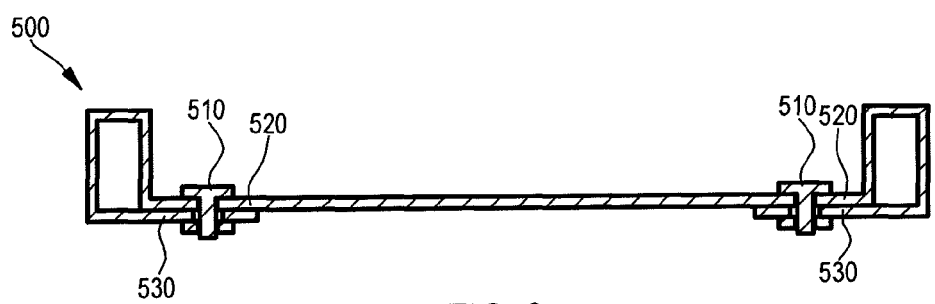
FIG. 9 is a side view of a back plate according to a fourth embodiment of the present invention.

FIG. 9 is a side view of a back plate according to a fourth embodiment of the present invention, which is used for the edge-lit type liquid crystal display and the direct type liquid crystal display.

The back plate 500 of the forth embodiment is identical to the back plate of the first embodiment. However, it further includes a screw 510, such that the supporting portion 520 is connected with the back plate bottom portion 530 by a screw and nut joint.

Figure 10:
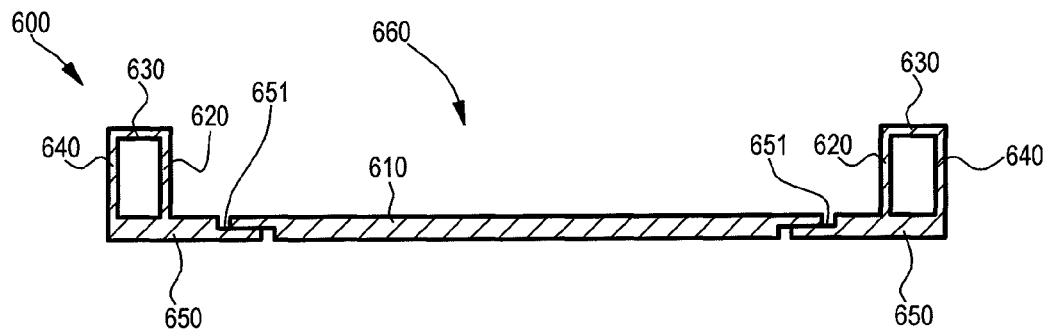
FIG. 10 is a side view of a back plate according to a fifth embodiment of the present invention.

FIG. 10 is a side view of a back plate according to a fifth embodiment of the present invention, which is used for the edge-lit type liquid crystal display and the direct type liquid crystal display.

As shown in FIG. 10, a first vertical wall 620, a back plate bottom portion 650, a second vertical wall 640 and a horizontal wall 630 of a back plate 600 constitute a square structure. The back plate bottom portion 650 is extended inward and formed with a supporting portion 651 in the extending portion. The supporting portion 651 is connected with the bottom part 610, such that the bottom part 610 and the first vertical wall 620 form an accommodation space 660.

Figure 11:
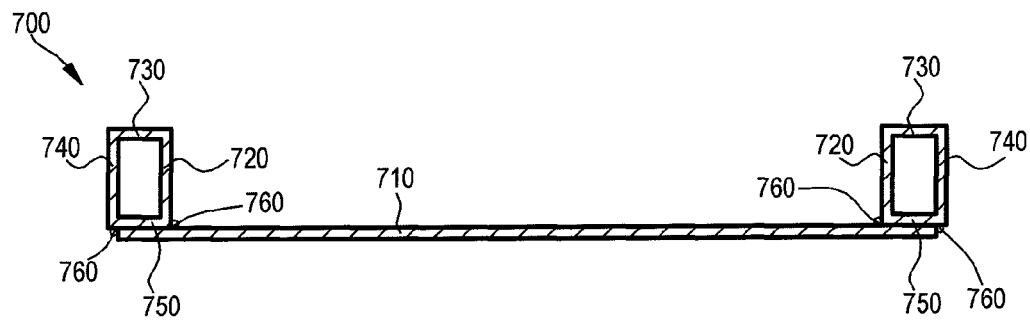
FIG. 11 is a side view of a back plate according to a sixth embodiment of the present invention.

FIG. 11 is a side view of a back plate according to a sixth embodiment of the present invention, which is used for the edge-lit type liquid crystal display and the direct type liquid crystal display.

As shown in FIG. 11, a second horizontal wall 750 is disposed corresponding to a first horizontal wall 730, such that a first vertical wall 720, a second vertical wall 740, the first horizontal wall 730 and the second horizontal wall 750 constitute a square structure. A back plate bottom portion 710 is connected with the second horizontal wall 750 by soldering. A solder joint 760 may be located at an interface area between the second horizontal wall 750 and the back plate bottom portion 710.

Figure 12:
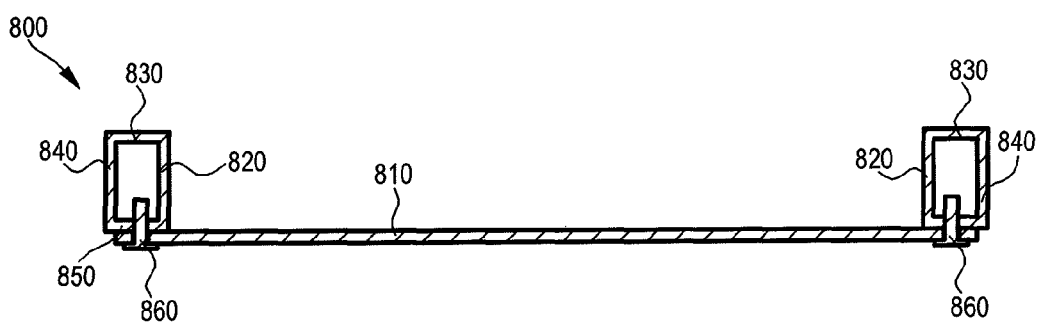
FIG. 12 is a side view of a back plate according to a seventh embodiment of the present invention.

FIG. 12 is a side view of a back plate according to a seventh embodiment of the present invention, which is used for the edge-lit type liquid crystal display and the direct type liquid crystal display.

As shown in FIG. 12, a second horizontal wall 850 is disposed corresponding to a first horizontal wall 830, such that a first vertical wall 820, a second vertical wall 840, the first horizontal wall 830 and the second horizontal wall 850 constitute a square structure. A back plate bottom portion 810 is connected with the second horizontal wall 850 by a screw 860. The screw 860 passes through the back plate bottom portion 810 and the second horizontal wall 850.

From above, the effects of the back plate, the backlight module having the same, and the liquid crystal display using the same of the present invention lie in that: by using a square structure constituted by a first vertical wall, a second vertical wall, a first horizontal wall and a back plate bottom portion (or a second horizontal wall), the back plate can increase its strength to resist external forces, and reduce manufacturing cost and weight.

Although the present invention is disclosed through the above embodiments, the embodiments are not intended to limit the present invention. Equivalent replacements like variations and modifications made by any person skilled in the similar art without departing from the spirit and scope of the present invention shall still fall within the protection scope of the present invention.

What is claimed is:

1. A back plate, comprising:
   a first vertical wall;
   a second vertical wall, the first vertical wall being connected with the second vertical wall by a first horizontal wall;
   a back plate bottom portion, disposed corresponding to the first horizontal wall, such that the first vertical wall and the second vertical wall, the first horizontal wall, and the back plate bottom portion constitute a square structure; and
   a bending portion, connected with the first vertical wall and located above or under the back plate bottom portion, and the bending portion is directly connected with the back plate bottom portion by a mortise and tenon joint or a screw and nut joint;
   wherein the first vertical wall, the back plate bottom portion, the bending portion, the second vertical wall, and the first horizontal wall are made of a same material and integrally formed.

2. A backlight module, comprising:
   a back plate as claimed in claim 1; and
   a light source, disposed in the accommodation space.

3. The backlight module as claimed in claim 2, wherein the light source is disposed above the back plate bottom portion or the bending portion.

4. The backlight module as claimed in claim 2, wherein the light source is disposed on the first vertical wall.

5. A liquid crystal display, comprising:
   a liquid crystal panel; and
   a backlight module as claimed in claim 2.

6. A back plate, comprising:
   a first vertical wall;
   a second vertical wall, the first vertical wall being connected with the second vertical wall by a first horizontal wall and a second horizontal wall, so as to constitute a square structure;
   a back plate bottom portion, disposed under the second horizontal wall and directly connected with the second horizontal wall by a mortise and tenon joint, a screw and nut joint or a welding means;
   wherin the first vertical wall, the back plate bottom portion, the second vertical wall, the second horizontal wall, and the first horizontal wall are made of a same material and integrally formed.

7. A backlight module, comprising:
   a back plate as claimed in claim 6; and
   a light source, disposed in the accommodation space.

8. The backlight module as claimed in claim 7, wherein the light source is disposed above the back plate bottom portion.

9. The backlight module as claimed in claim 7, wherein the light source is disposed on the first vertical wall.

10. A liquid crystal display, comprising:
    a liquid crystal panel; and
    a backlight module, as claimed in claim 7.

* * * * *